United States Patent Office

3,494,879
Patented Feb. 10, 1970

3,494,879
PREPARATION OF FREE-FLOWING FOAMABLE POLYSTYRENE BEADS
Alfred J. Ackerman, Bloomingdale, N.J. (5886 S. Shandle Blvd., Mentor, Ohio 44060), and Frederick E. Carrock, 151 Albright Lane, Paramus, N.J. 07652
No Drawing. Filed May 23, 1966, Ser. No. 551,955
Int. Cl. C08f 47/10
U.S. Cl. 260—2.5                                        1 Claim

ABSTRACT OF THE DISCLOSURE

A process for preparing foamable beads by suspending the beads in an aqueous system, heating the system to about 100° C., adding a hydrocarbon blowing agent in the space above the liquid suspension phase, maintaining the conditions so the hydrocarbon blowing agent remains a gas in the system, cooling the suspension and recovering free-flowing foamable beads.

---

This invention relates to a process for preparing free-flowing foamable thermoplastic resins. More particularly, it relates to a process for impregnating polystyrene-containing beads with a blowing agent to produce foamable beads without causing the formation of bead clusters.

Foamable beads containing a blowing agent are widely used in the production of rigid polymer foams. The blowing agent has a boiling point below the softening point of the thermoplastic beads and exerts very little solvent action on the beads. When the foamable beads are heated to their softening point, the blowing agent vaporizes causing the beads to expand 5 to 30 times their original size. The foamable beads are easily molded into a wide variety of useful articles including cups, packaging materials, refrigerator and structural components, insulation board and the like.

The prior art shows various processes for impregnating thermoplastic beads with blowing agents to produce foamable beads. In U.S. Patent No. 2,983,692 one such process is described in which polystyrene beads are impregnated with liquid petroleum ether at conditions to maintain the petroleum ether in a liquid state. The process of this patent requires the use of an inorganic suspending agent and an anionic surface active agent to produce free-flowing foamable beads. In U.S. Patent No. 3,088,925, the use of polyvinyl alcohol is required at conditions similar to the preceding impregnation process to prevent agglomeration of the beads. In U.S. Patent No. 3,126,354, dry butane gas is used to impregnate the beads in a nonaqueous environment. However, long impregnation periods are required to impregnate beads with normally gaseous blowing agents.

In contrast to these prior art processes, the present invention is directed to a process wherein thermoplastic beads are suspended in an organic suspending agent, and a normally liquid hydrocarbon blowing agent, such as petroleum ether, pentane, hexane, heptane, cyclopentane, cyclohexane, cyclopentadiene or mixtures thereof, is added in its vaporized form to the resulting suspension and is maintained in the vaporized form throughout the process period. This process results in an improvement over prior processes for incorporating a blowing agent into thermoplastic beads to produce foamable beads. The resulting beads from this process are free-flowing and do not have the tendency to form clusters or agglomerates. The blowing agent is impregnated into the beads in relatively short periods with the aqueous solution containing the organic suspending agents.

Therefore, it is an object of the present invention to provide a more efficient process for preparing free-flowing foamable beads than prior processes.

In accordance with this invention, there is provided a process for preparing foamable beads which comprises suspending thermoplastic beads comprising a styrene polymer in an aqueous solution containing an organic suspending agent in a suspension zone, heating the resulting suspension of beads to a temperature of 80° to 120° C., adding to the suspension zone a hydrocarbon blowing agent boiling in the range of about 30° to 100° C., maintaining the suspension zone at a temperature in the range from about 80° to 120° C. and a pressure in the range of about 1 to 9 atmospheres for a period of about 1 to 10 hours, cooling the suspension, separating from the suspension the beads impregnated with about 1 to 20 weight percent of the blowing agent, drying the impregnated beads, and recovering essentially unclustered and free-flowing foamable beads. The conditions in the suspension zone are selected to prevent the blowing agent from condensing into the liquid phase.

A more specific embodiment of the present invention provides a process for preparing foamable beads which comprises suspending polystyrene beads in an aqueous solution containing an organic suspending agent in a suspension zone, heating the resulting suspension of beads to a temperature of about 80° to 120° C., adding pentane to the suspension zone at a rate sufficient to vaporize the pentane in the space above the liquid suspension phase, continuously agitating the suspension at a temperature in the range from about 80° to 120° C. and a pressure in the range from about 1 to 3.5 atmospheres at 80° C. to about 1 to 9 atmospheres at 120° C. for a period of about 1 to 10 hours, cooling the suspension to a temperature of about 20° to 60° C., separating from the suspension the beads impregnated with about 1 to 10 weight percent of the pentane, washing and drying the impregnated beads, and recovering essentially unclustered and free-flowing foamable beads.

The organic suspending agent used in the process of this invention comprises any suitable agent such as methyl cellulose, carboxymethyl cellulose, hydroxyethyl cellulose, or hydroxyethyl cellulose with sodium salts of condensed aryl sulfonic acid or with polyoxyethylene. The organic suspending agent forms very stable suspensions of the beads in the aqueous solution, permitting their rapid impregnation. Examples of the sodium salts of condensed aryl sulfonic acid include sodium benzene sulfonate, sodium metaxylene sulfonate, sodium alpha-naphthalene sulfonate, sodium beta-naphthalene sulfonate, sodium paramethylbenzene sulfonate, sodium ortho-methylbenzene sulfonate, sodium 2,4 - dimethylbenzene sulfonate, 2,4,6-trimethylbenzene sulfonate, sodium paradodecylbenzene sulfonate and sodium ortho-dodecylbenzene sulfonate.

The thermoplastic resins used in the process of this invention comprise homopolymers of styrene, copolymers of styrene containing a major portion of styrene, and blends of styrene polymers with copolymer, i.e., butadiene-styrene. Such materials have a glass transition temperature of above 50° C. and usually about 85° to 100° C. The resins are added to the process of this invention in the form of discrete particles or beads having an average particle size of between about 10 and 60 msh, preferably between 20 and 40 mesh.

Each of the steps of the process is carried out in conventional equipment. The suspension zone comprises, for example, a glass-lined vessel with an agitator. Any suitable means can be used for heating the bead suspension to the correct temperature and for maintaining the suspension at that temperature such as steam coils or steam jacket. The hydrocarbon blowing agent can be either added to the suspension vessel in its vaporized form or added at a rate sufficient to vaporize the blowing agent in the vapor space above the liquid interface. This rate can easily be controlled by regulation of pressure. When the rate of blowing agent addition increases, the pressure in the suspension vessel increases to a predetermined maximum which automatically causes the addition rate to decrease. Close regulation of both temperature and pressure is important to prevent the blowing agent from condensing into the liquid phase. After the beads have been suspended in the presence of the blowing agent for the proper length of time, they are cooled by either direct and/or indirect coolant. The beads are separated from the suspension solution by any suitable method such as filtering or centrifuging. The beads are preferably washed with water to remove traces of suspension solution before they are dried. One suitable method for drying the beads is in a forced air drier.

While no attempt is made to set forth in detail any theory to explain the mechanisms of the improved thermoplastic bead impregnation process, it is believed that the vaporized blowing agent, which has a limited solubility in the liquid phase, is maintained at low concentrations adjacent to the suspended beads. This results in the uniform incorporation of the blowing agent throughout the entire volume of the beads and not just the surface of the beads. It is also believed that high localized concentrations are developed at the surface of the beads when a liquid blowing agent is used which softens and tends to solubilize the surface. Thus, when two or more beads are brought into contact, agglomeration occurs. Agglomeration is virtually eliminated by the process of this invention through use of the vaporized blowing agent.

The following examples illustrate the present invention:

EXAMPLE 1

In a half-gallon glass suspension vessel, 2 grams of a high viscosity (1 percent aqueous solution is in the range of 1500 to 2500 cps. at 25° C. as measured on a Brookfield viscometer) and rapidly dissolving hydroxyethyl cellulose sold under the trademark Natrosol 250HR and 2 grams of a mixture of sodium salts of condensed aryl sulfonic caid (1 percent aqueous solution has a surface tension of 58.5 dynes) sold under the trademark Tamol SN were dissolved in 800 grams of water. Approximately 300 grams of polystryene beads having an average particle size of 20 to 40 mesh were suspended therein by agitation. The vessel was purged with nitrogen, heated to 100° C., vented to 1 atmosphere and heated to 105° C. Approximately 33 grams of n-pentane were added to the vessel at a rate sufficient to vaporize the n-pentane in the space above the liquid interface. The pressure in the vessel was maintained at no more than 6 atmospheres to maintain the n-pentane in its vaporized form. The suspension of beads was continuously agitated and vessel maintained at 105° C. for 4 hours and thereafter cooled to 35° C. for removal from the vessel. The resulting beads were filtered, washed and dried. The beads contained 5.4 weight percent pentane after drying and were free-flowing and essentially unclustered.

EXAMPLE 2

The steps of Example 1 were repeated except that the suspension was heated to 115° C. and the vessel was maintained at this temperature for 5 hours. The pressure in the vessel was maintained at less than 8 atmospheres in order to maintain the n-pentane in its vaporized form. The resulting impregnated beads contained 5.1 weight percent pentane after drying and were free-flowing. No bead clusters were observed in the product.

EXAMPLE 3

A series of 6 runs were made in a 100 gallon glass-lined vessel. In each run, approximately 500 pounds of a suspension solution was added to the vessel. The suspension solution contained 0.6 to 1 percent of the same mixture of the high viscosity hydroxyethyl cellulose and sodium salts of condensed aryl sulfonic acid as used in the above examples. Approximately 150 pounds of polystyrene beads having an average particle size of 20 to 40 mesh were suspended in the solution by agitation. The suspension of beads was heated to 100° C. The n-pentane was continuously added to the suspension over a 3 hour period at a rate sufficient to vaporize the pentane in the headspace in the vessel above the liquid suspension phase. The suspension was continuously agitated and maintained in contact with the vaporized blowing agent for an additional 6 hours to complete the impregnation. In each of the runs the suspension was cooled to 40° C. by external circulation of water. Cold water was added to the suspension to bring the solution to a final temperature of 33° C. The beads were removed from the vessel, centrifuged and dried to obtain essentially unclustered free-flowing beads.

The table below indicates the amounts of n-pentane that were added to the suspension, the pressure maintained in the system and the resulting level of pentane in the dried beads in each of the 6 runs:

| Run | Pentane added, percent | System pressure, p.s.i.g. | Amount of pentane in dried beads, percent |
| --- | --- | --- | --- |
| 1 | 8 | 60 | 4.2 |
| 2 | 8 | 45 | 4.0 |
| 3 | 9.5 | 66 | 4.8 |
| 4 | 10.5 | 57 | 6.0 |
| 5 | 8 | 52 | 4.2 |
| 6 | 9.5 | 55 | 4.5 |

It is apparent that numerous variations can be made in the specific embodiments of this invention without departing from its spirit, and all such variations that fall within the scope of the appended claim are intended to be embraced thereby.

What is claimed is:
1. The process for preparing foamable beads which comprises the following steps:
 (a) suspending polystyrene beads in an aqueous solution containing an organic suspending agent of hydroxyethylcellulose in conjunction with sodium salts of condensed aryl sulfonic acid in a suspension zone,
 (b) heating the resulting suspension of beads to a temperature of about 80° to 120° C.,
 (c) adding pentane to said suspension zone at the rate sufficient to vaporize said pentane in the space above the liquid suspension phase,
 (d) continuously agitating said suspension at a temperature in the range from about 80° to 120° C. and a pressure in the range from about 1 to 3.5 atmospheres at 80° C. to about 1 to 9 atmospheres at 120° C. for a period of about 1 to 10 hours, the conditions being selected to prevent said pentane from condensing,
 (e) cooling said suspension,
 (f) separating from said suspension the beads impregnated with about 1 to 20 weight percent of said pentane,
 (g) drying the impregnated beads, and
 (h) recovering from step (g) essentially unclustered and free-flowing foamable beads.

References Cited

UNITED STATES PATENTS

| | | |
| --- | --- | --- |
| 2,893,963 | 7/1959 | Cleland et al. |
| 2,983,692 | 5/1961 | D'Alelio. |
| 3,027,335 | 3/1962 | Wright. |
| 3,342,760 | 9/1967 | Rode et al. |

MURRAY TILLMAN, Primary Examiner

W. J. BRIGGS, Sr., Assistant Examiner

U.S. Cl. X.R.

260—17, 29.6, 33.6, 93.5